(12) United States Patent
Pervyshin

(10) Patent No.: US 6,394,560 B1
(45) Date of Patent: May 28, 2002

(54) WHEEL DRIVEN PUMP IN A HYDRAULIC BRAKE SYSTEM

(76) Inventor: Nikolai N. Pervyshin, #47 Sherman Drive, Saint Catharines, Ontario (CA), L2N 2L3

( * ) Notice: Subject to any disclaimer, the term of this patent is extended or adjusted under 35 U.S.C. 154(b) by 0 days.

(21) Appl. No.: 09/765,470

(22) Filed: Jan. 22, 2001

(51) Int. Cl.[7] ................................................ F04B 1/26
(52) U.S. Cl. ..................................... 303/116.3; 417/218
(58) Field of Search ........................... 303/116.3, 10.11; 417/218, 222.1

(56) References Cited

U.S. PATENT DOCUMENTS

| | | |
|---|---|---|
| 3,724,205 A | 4/1973 | Hallberg |
| 3,887,049 A | 6/1975 | Ito et al. |
| 3,912,033 A | 10/1975 | Ancel |
| 4,210,369 A * | 7/1980 | Curnutt ................ 303/116.3 |
| 4,278,300 A | 7/1981 | Bacher |
| 5,108,267 A | 4/1992 | Horst |
| 5,390,759 A | 2/1995 | Gollner |

* cited by examiner

Primary Examiner—Matthew C. Graham

(57) ABSTRACT

A hydraulic brake system for preventing wheel lock. The hydraulic brake system includes a variable displacement rotary pump that is activated by the rotation of an axle of a vehicle. A hydraulic control cylinder of the variable displacement rotary pump is operationally coupled to a master cylinder and a displacement piston of the hydraulic control cylinder is operationally coupled to a swash plate of the variable displacement rotary pump for manipulating an amount of brake fluid flowing from the variable displacement rotary pump to a wheel brake cylinder. An outlet port of the variable displacement rotary pump is operationally coupled to the wheel brake cylinder by a section of brake line and to a fluid reservoir through a throttle valve. An inlet port of the variable displacement rotary pump is operationally coupled to a reservoir outlet port by a section of brake line. The wheel brake cylinder is coupled to the wheel of the vehicle to slow down the vehicle when the wheel brake cylinder is activated. When the wheel is rotating, the variable displacement rotary pump is activated and when the swash plate is properly positioned, the variable displacement rotary pump creates brake fluid pressure thereby activating the wheel brake cylinder to slow down the vehicle. Moreover, if the wheel ceases to rotate, the variable displacement rotary pump ceases to apply pressure to the wheel brake cylinder thereby allowing the wheel to rotate once again.

19 Claims, 2 Drawing Sheets

WHEEL DRIVEN PUMP IN A HYDRAULIC BRAKE SYSTEM

BACKGROUND OF THE INVENTION

1. Field of the Invention

The present invention relates to vehicle brake systems and more particularly pertains to a new hydraulic brake system for preventing wheel lock.

2. Description of the Prior Art

The use of vehicle brake systems is known in the prior art. More specifically, vehicle brake systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,278,300; U.S. Pat. No. 3,887,049; U.S. Pat. No. 5,108,267; U.S. Pat. No. 3,912,033; U.S. Pat. No. 3,724,205; and U.S. Pat. No. 5,390,759.

While these devices fulfill their respective, particular objectives and requirements, the aforementioned patents do not disclose a new hydraulic brake system. The inventive device includes a variable displacement rotary pump that is activated by the rotation of an axle of a vehicle. A hydraulic control cylinder of the variable displacement rotary pump is operationally coupled to a master cylinder and a displacement piston of the hydraulic control cylinder is operationally coupled to a swash plate of the variable displacement rotary pump for manipulating an amount of brake fluid flowing from the variable displacement rotary pump to a wheel brake cylinder. An outlet port of the variable displacement rotary pump is operationally coupled to the wheel brake cylinder by a section of brake line and to a fluid reservoir through a throttle valve. An inlet port of the variable displacement rotary pump is operationally coupled to a reservoir outlet port by a section of brake line. The wheel brake cylinder is coupled to the wheel of the vehicle to slow down the vehicle when the wheel brake cylinder is activated. When the wheel is rotating, the variable displacement rotary pump is activated and when the swash plate is properly positioned, the variable displacement rotary pump creates brake fluid pressure thereby activating the wheel brake cylinder to slow down the vehicle. Moreover, if the wheel ceases to rotate, the variable displacement rotary pump ceases to apply pressure to the wheel brake cylinder thereby allowing the wheel to rotate once again.

In these respects, the hydraulic brake system according to the present invention substantially departs from the conventional concepts and designs of the prior art, and in so doing provides an apparatus primarily developed for the purpose of preventing wheel lock.

SUMMARY OF THE INVENTION

In view of the foregoing disadvantages inherent in the known types of vehicle brake systems now present in the prior art, the present invention provides a new hydraulic brake system construction wherein the same can be utilized for preventing wheel lock.

The general purpose of the present invention, which will be described subsequently in greater detail, is to provide a new hydraulic brake system apparatus and method which has many of the advantages of the vehicle brake systems mentioned heretofore and many novel features that result in a new hydraulic brake system which is not anticipated, rendered obvious, suggested, or even implied by any of the prior art vehicle brake systems, either alone or in any combination thereof.

To attain this, the present invention generally comprises a variable displacement rotary pump that is activated by the rotation of an axle of a vehicle. A hydraulic control cylinder of the variable displacement rotary pump is operationally coupled to a master cylinder and a displacement piston of the hydraulic control cylinder is operationally coupled to a swash plate of the variable displacement rotary pump for manipulating an amount of brake fluid flowing from the variable displacement rotary pump to a wheel brake cylinder. An outlet port of the variable displacement rotary pump is operationally coupled to the wheel brake cylinder by a section of brake line and to a fluid reservoir through a throttle valve. An inlet port of the variable displacement rotary pump is operationally coupled to a reservoir outlet port by a section of brake line. The wheel brake cylinder is coupled to the wheel of the vehicle to slow down the vehicle when the wheel brake cylinder is activated. When the wheel is rotating, the variable displacement rotary pump is activated and when the swash plate is properly positioned, the variable displacement rotary pump creates brake fluid pressure thereby activating the wheel brake cylinder to slow down the vehicle. Moreover, if the wheel ceases to rotate, the variable displacement rotary pump ceases to apply pressure to the wheel brake cylinder thereby allowing the wheel to rotate once again.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hydraulic brake system apparatus and method which has many of the advantages of the vehicle brake systems mentioned heretofore and many novel features that result in a new hydraulic brake system which is not anticipated, rendered obvious, suggested, or even implied by any of the prior art vehicle brake systems, either alone or in any combination thereof.

It is another object of the present invention to provide a new hydraulic brake system that may be easily and efficiently manufactured and marketed.

It is a further object of the present invention to provide a new hydraulic brake system that is of a durable and reliable construction.

An even further object of the present invention is to provide a new hydraulic brake system which is susceptible of a low cost of manufacture with regard to both materials and labor, and which accordingly is then susceptible of low prices of sale to the consuming public, thereby making such hydraulic brake system economically available to the buying public.

Still yet another object of the present invention is to provide a new hydraulic brake system which provides in the apparatuses and methods of the prior art some of the advantages thereof, while simultaneously overcoming some of the disadvantages normally associated therewith.

Still another object of the present invention is to provide a new hydraulic brake system for preventing wheel lock.

Yet another object of the present invention is to provide a new hydraulic brake system which includes a variable displacement rotary pump that is activated by the rotation of an axle of a vehicle. A hydraulic control cylinder of the variable displacement rotary pump is operationally coupled to a master cylinder and a displacement piston of the hydraulic control cylinder is operationally coupled to a swash plate of the variable displacement rotary pump for manipulating an amount of brake fluid flowing from the variable displacement rotary pump to a wheel brake cylinder. An outlet port of the variable displacement rotary pump is operationally coupled to the wheel brake cylinder by a section of brake line and to a fluid reservoir through a throttle valve. An inlet port of the variable displacement rotary pump is operationally coupled to a reservoir outlet port by a section of brake line. The wheel brake cylinder is coupled to the wheel of the vehicle to slow down the vehicle when the wheel brake cylinder is activated. When the wheel is rotating, the variable displacement rotary pump is activated and when the swash plate is properly positioned, the variable displacement rotary pump creates brake fluid pressure thereby activating the wheel brake cylinder to slow down the vehicle. Moreover, if the wheel ceases to rotate, the variable displacement rotary pump ceases to apply pressure to the wheel brake cylinder thereby allowing the wheel to rotate once again.

Still yet another object of the present invention is to provide a new hydraulic brake system that increases safety in heavy breaking situations.

Even still another object of the present invention is to provide a new hydraulic brake system that increases longevity of wheel brake units and tires.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
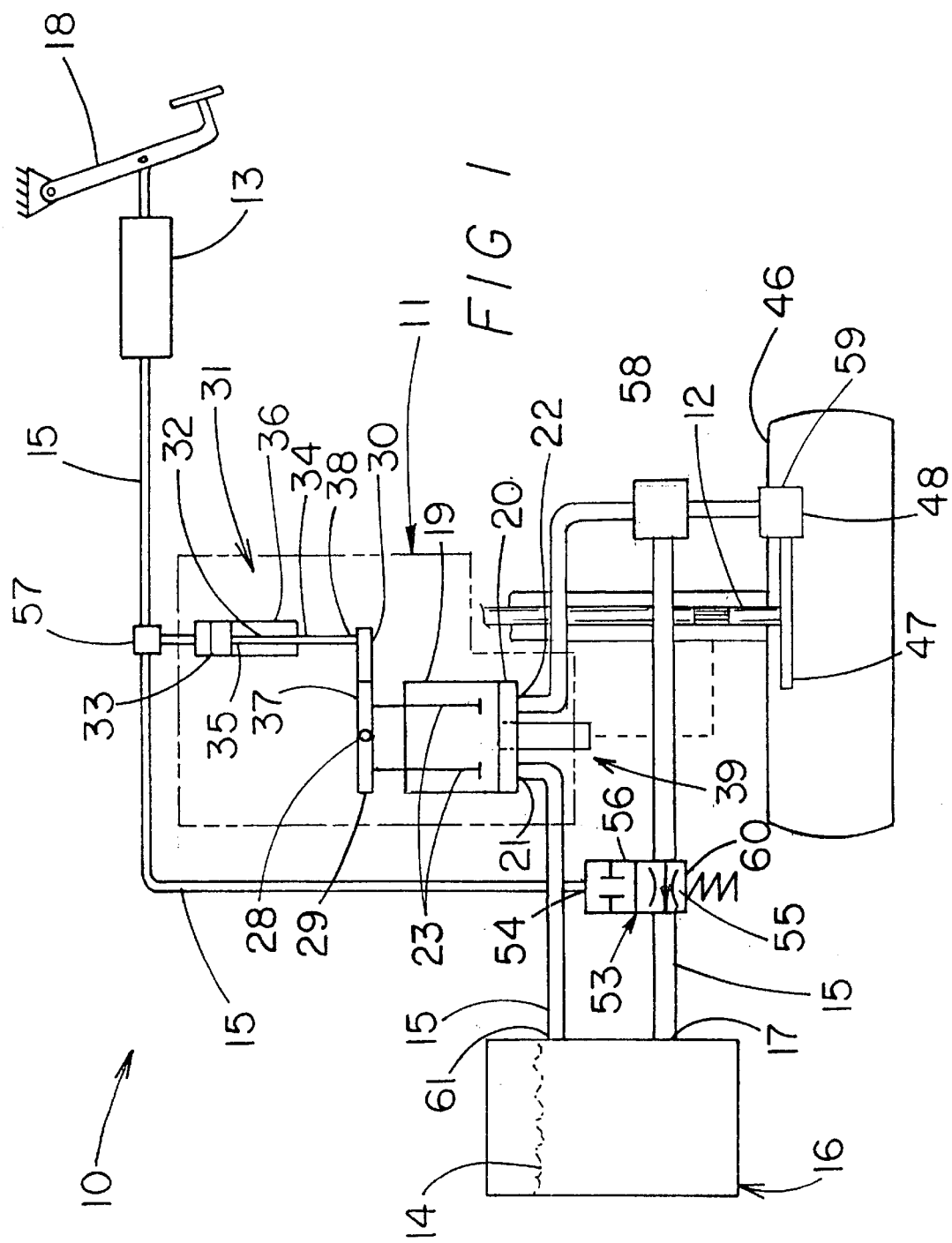
FIG. 1 is a schematic side view of a new hydraulic brake system according to the present invention.
Figure 2:
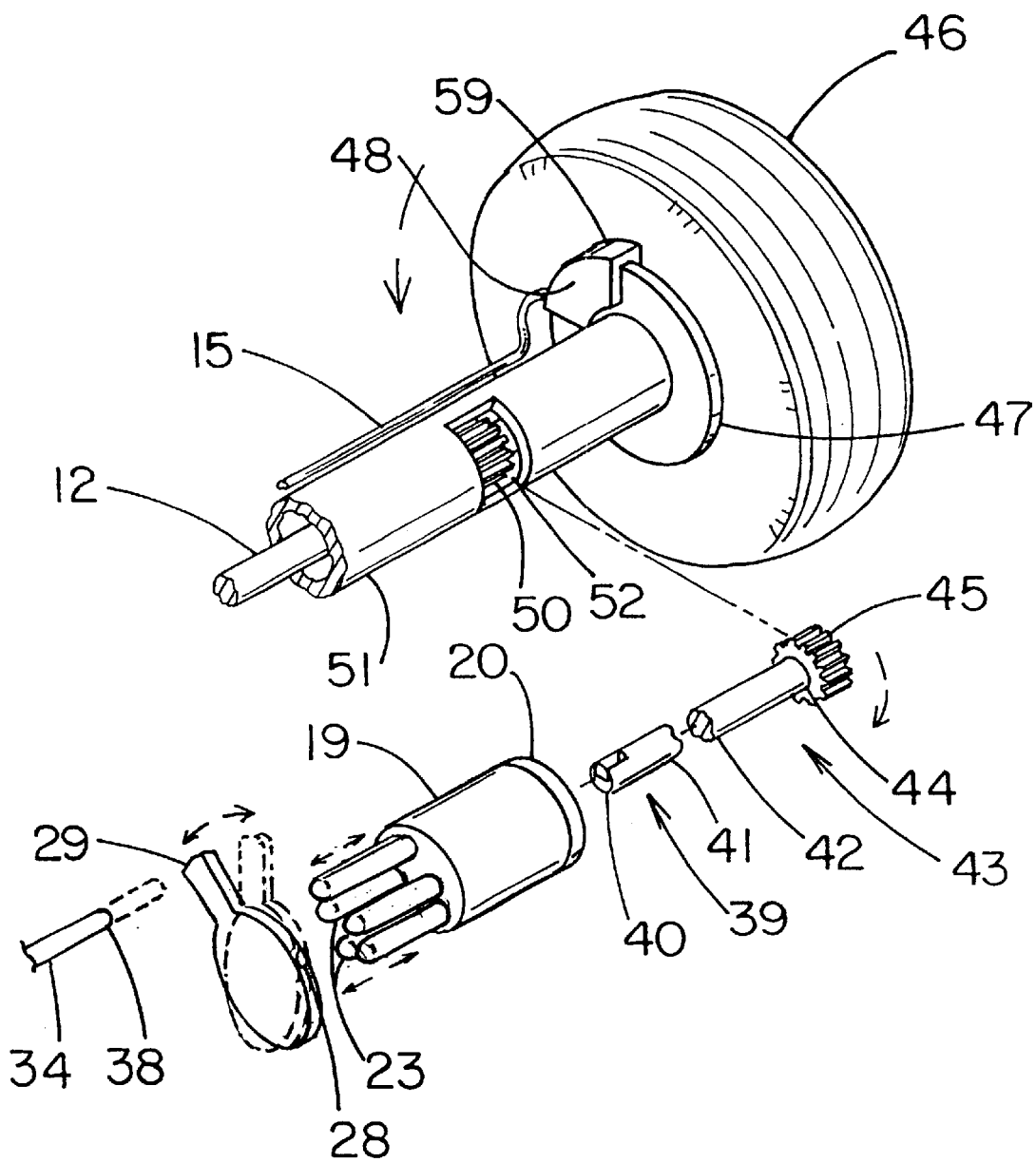
FIG. 2 is a schematic perspective view of the variable displacement rotary pump and wheel of the present invention, illustrating how the variable displacement rotary pump runs off the wheel.

With reference now to the drawings, and in particular to FIGS. 1 through 2 thereof, a new hydraulic brake system embodying the principles and concepts of the present invention and generally designated by the reference numeral 10 will be described.

As best illustrated in FIGS. 1 through 2, the hydraulic brake system 10 generally comprises a variable displacement rotary pump that is activated by a moving axle 12 of a wheel 46 of a vehicle and that is regulated by a master cylinder 13.

In closer detail, the hydraulic brake system 10 includes a quantity of brake fluid 14 and plurality of sections of brake line 15. Each section of brake line 15 is adapted for containing the brake fluid 14. In addition, a fluid reservoir 16 holds a quantity of brake fluid 14. The fluid reservoir 16 has a reservoir inlet port 17 that is in fluid communication with a section of the brake line 15 and a reservoir outlet port 61 that is in fluid communication with another section of the brake line 15.

The hydraulic brake system 10 also includes a brake pedal 18. The brake pedal 18 is for applying pressure by a foot of a user. The master cylinder 13 is operationally coupled to the brake pedal 18 to activate the master cylinder 13 when pressure is applied to the brake pedal 18. Moreover, the master cylinder 13 pressurizes the brake fluid 14 when the master cylinder 13 is activated. Thus when the brake pedal 18 is depressed by a foot of a user, the master cylinder 13 is activated thereby increasing the pressure of the brake fluid 14 in the sections of brake line 15.

The variable displacement rotary pump 11 is for applying variable brake pressure to the wheel brake cylinder 59. The variable displacement rotary pump 11 includes a rotating generally cylindrical block 19 with pistons 23, a valve plate 20 that is rotating coupled to the cylinder block 19, a swash plate 29 and a hydraulic control cylinder 31.

The valve plate 20 of the variable displacement rotary pump 11 has a pump inlet port 21 that is in fluid communication with a section of the brake line 15 for allowing the brake fluid 14 to flow into the cylinder block 19 of the variable displacement rotary pump 11. In addition, the pump inlet port 21 of the valve plate 20 is operationally coupled to the reservoir outlet port 61 by a section of brake line 15. The valve plate 20 further has a pump outlet port 22 that is in fluid communication with a section of the brake line 15. The pump outlet port 22 allows brake fluid 14 to flow out of the cylinder block 19.

The variable displacement rotary pump 11 is a reciprocating piston pump and includes the movable pistons 23 for pulling in and pushing out brake fluid 14 into and out of the cylinder block 19.

In addition, the variable displacement rotary pump 11 includes a generally disk shaped swash plate 29. The swash plate 29 is designed to manipulate a pumping action of pistons 23. The swash plate 29 has a lower surface 30 and a pivot shaft 28.

A distal end of each piston 23 abuts the lower surface 30 of the swash plate 29. Pistons 23 move into and out of the cylinder block 19 only when the swash plate 29 is pivoted about the pivot shaft 28 and the cylinder block 19 rotates. This action regulates the flow of the brake fluid 14 going to the wheel brake cylinder 59.

The variable displacement rotary pump 11 further includes a hydraulic control cylinder 31. The hydraulic control cylinder 31 manipulates the swash plate 29. The hydraulic control cylinder 31 includes a displacement piston 32 that has a cylindrical head portion 33 and an elongated rod portion 34. A first end 35 of the rod portion 34 is coupled the head portion 33.

The hydraulic control cylinder 31 further includes a cylindrical wall 36. The hydraulic control cylinder 31 is operationally coupled to the master cylinder 13 by a section of brake line 15. Thus, pressurized brake fluid 14 moves the displacement piston 32 along the wall 36 of the hydraulic control cylinder 31 when the master cylinder 13 is activated. Moreover, when the master cylinder 13 is deactivated the displacement piston 32 moves back to its original position.

The swash plate 29 has a upper surface 37. A second end 38 of the rod portion 34 of the displacement piston 32 abuts the upper surface 37 of the swash plate 29 at a predetermined distance from the pivot shaft 28 of the swash plate 29. Thus when the displacement piston 32 is moved, the rod portion 34 pivots the swash plate 29 about the pivot shaft 28.

The hydraulic brake system 10 further includes a pump drive rod 39 for activating the variable displacement rotary pump 11. The pump drive rod 39 has a first end 40 that extends through the valve plate 20 and is coupled to the cylinder block 19 for rotating the cylinder block 19. The pump drive rod 39 has a second end 41 coupled to a fist end 42 of a pump drive shaft 43. A second end 44 of the pump drive shaft 43 terminates in a pump drive gear 45.

The wheel 46 of the vehicle has an axle 12 for rotating the wheel 46. The axle 12 has a distal end that may be connected to a rotor 47 or a drum of a brake system for slowing the vehicle down. The brake system includes a hydraulic brake caliper 48 or a hydraulic drum braking system 49 and a wheel brake cylinder 59 is a part of the hydraulic brake caliper 48 or the hydraulic drum braking system 49.

The axle 12 includes an axle gear 50 that is designed to engage the pump drive gear 45. In addition, an axle housing 51 encases the axle 12. The axle housing 51 has an axle cutout portion 52. The axle cutout portion 52 is positioned adjacent to the axle gear 50. The axle cutout portion 52 allows engagement of the axle gear 50 with the pump drive gear 45. Thus, when the axle 12 is rotating, the variable displacement rotary pump 11 is activated and when the axle 12 is not moving, the variable displacement rotary pump 11 is deactivated.

The hydraulic brake system 10 includes a throttle valve 53. The throttle valve 53 regulates the flow of brake fluid 14 into the reservoir inlet port 17 of the fluid reservoir 16 from the variable displacement rotary pump 11 and the wheel brake cylinder 59. The throttle valve 53 has a control throttle valve port 54 in fluid communication with the master cylinder 13 by a section of brake line 15. In addition, the throttle valve 53 has two positions, 55 and 56. A standard position 55 allows the brake fluid 14 to bleed from the variable displacement rotary pump 11 and the wheel brake cylinder 59 into the fluid reservoir 16. A second position 56 stops the flow of brake fluid 14.

The throttle valve 53 further includes a spring valve 60 which is designed to move upon being exposed to a predetermined amount of pressure in the control valve port 54 for changing the standard position 55 into the second position 56.

The hydraulic brake system 10 also includes a tubular first T-fitting 57 designed for coupling three sections of brake line 15. The control throttle valve port 54 of the throttle valve 53 is operationally coupled to the first T-fitting 57 with a section of brake line 15. The master cylinder 13 is also operationally coupled to said first T-fitting with a section of brake line 15. In addition, the hydraulic control cylinder 31 is operationally coupled to the first T-fitting 57 with a section of brake line 15.

The hydraulic brake system 10 further includes a tubular second T-fitting 58 designed for coupling together three sections of brake lines 15. The pump outlet port 22 is operationally coupled to the second T-fitting 58 by a section of brake line 15. The throttle valve 53 is also operationally coupled to the second T-fitting 58 by a section of brake line 15. In addition, the hydraulic brake caliper 48 or the hydraulic drum braking system 49 is operationally coupled to the second T-fitting 58 by a section of brake line 15.

In use, the cylinder block 19 rotates when the wheel rotates. When the brake pedal 18 is depressed the master cylinder 13 pressurizes the brake fluid 14. This pressure causes the displacement piston 32 to move thereby pivoting the swash plate 29 of the variable displacement rotary pump 11 about the pivot shaft 28. This action manipulates the movement of the pistons 23 within the cylinder block 18 thereby regulating the flow of brake fluid 14 from the variable displacement rotary pump 11 to the wheel brake cylinder 59. The farther the brake pedal 18 is depressed, the longer pumping action of pistons 23 it gives and causes more fluid 14 to be pushed into the wheel brake cylinder 59. Because the throttle valve 53 and its standard position 55 is designed to limit the amount of brake fluid 14 passing through it, pressure builds up in the brake lines 15 from the variable displacement rotary pump 11 trying to pump more and more brake fluid 14. The pressure activate the wheel brake cylinder 59 to slow down the vehicle.

If the wheel 46 of the vehicle locks up, the variable displacement rotary pump 11 is deactivated since the axle 12 of the vehicle is no longer rotating. At this point, the throttle valve 53 bleeds-off brake fluid 14 from the brake lines 15 into the fluid reservoir 16. This bleed-off reduces the pressure in the brake lines 15, which in turn causes the wheel brake cylinder 59 to ease up thereby allowing the wheel 46 of the vehicle to turn. With the axle 12 once again turning, the variable displacement rotary pump 11 becomes activated and if the brake pedal 18 is still depressed the process is repeated. This process occurs very quickly and takes place over and over again as long as the brake pedal 18 is depressed to decelerate the vehicle.

In addition, the hydraulic brake system 10 is designed to lock up the wheel 46 of the vehicle if the vehicle is slowly rolling. This allows the vehicle to come to a complete stop. The throttle valve 53 is designed to stop the flow of brake fluid 14 from the wheel brake cylinder 59 and the variable displacement rotary pump 11 to fluid reservoir 16 if the brake pedal 18 is depressed its maximum distance. When the brake pedal 18 is depressed its maximum distance the pressure created by the master cylinder 13 in brake line 15 is enough to move up the spring valve 60 in the throttle valve 53 and switch on the second position 56. This allows to block the pressurized brake fluid 14 in the wheel brake cylinder 59 and to lock the wheel 46. Thus, the wheel 46 of the vehicle is prevented from rolling.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hydraulic brake system for a motor vehicle comprising:
    a quantity of hydraulic brake fluid;
    a fluid reservoir for holding said hydraulic brake fluid;
    a plurality of sections of hydraulic brake line, each section of said hydraulic line being adapted for containing said brake fluid;
    a variable displacement rotary pump for applying variable pressure to said brake fluid, said variable displacement rotary pump being operationally coupled to said fluid reservoir by a section of said brake line;
    a pump drive rod for activating said variable displacement rotary pump, said pump drive rod having a first end rotatably coupled to said variable displacement rotary pump;
    a swash plate for manipulating the amount of said brake fluid flowing from said variable displacement rotary pump, said swash plate being operationally coupled to said variable displacement rotary pump;
    a vehicle having an axle for rotating a wheel of said vehicle, said axle having a distal end, said distal end having a hydraulic brake thereon for slowing down said vehicle;
    said variable displacement rotary pump being operationally coupled to a wheel brake cylinder of said hydraulic brake by a section of said brake line; and
    said axle including an axle gear adapted to engage said pump drive rod wherein when said axle is rotating said variable displacement rotary pump is activated.

2. The hydraulic brake system for a motor vehicle of claim 1 further comprising:
    said variable displacement rotary pump including a generally cylindrical rotating cylinder block; and
    a generally cylindrical valve plate, said valve plate being rotatably coupled to said cylinder block.

3. The hydraulic brake system for a motor vehicle of claim 2 further comprising:
    said pump d rive rod having a first end extending through said valve plate and being coupled to said cylinder block wherein when said pump drive rod is rotated said cylinder block is rotated.

4. The hydraulic brake system for a motor vehicle of claim 1 further comprising:
    a pump drive shaft, said pump drive shaft having a first end coupled to a second end of said pump drive rod, and
    a second end of said pump drive shaft terminating in a pump drive gear.

5. The hydraulic brake system for a motor vehicle of claim 2 further comprising:
    said valve plate having a pump inlet port in fluid communication with a section of said brake line for allowing said brake fluid to flow into said cylinder block; and
    said valve plate further having a pump outlet port in fluid communication with a section of said brake line for allowing said brake fluid to flow out of said cylinder block.

6. The hydraulic brake system for a motor vehicle of claim 5 further comprising:
    said fluid reservoir having a reservoir inlet port in fluid communication with a section of said brake line; and
    said fluid reservoir having a reservoir outlet port in fluid communication with a section of said brake line, said inlet port of said valve plate being operationally coupled to said reservoir outlet port by said section of said hydraulic brake line.

7. The hydraulic brake system for a motor vehicle of claim 5 further comprising:
    said variable displacement rotary pump including movable pistons for pulling in and pushing out said brake fluid into and out of said cylinder block.

8. The hydraulic brake system for a motor vehicle of claim 7 further comprising:
    said swash plate having a lower surface, and a pivot shaft; and
    a distal end of each of said pistons abutting said lower surface of said swash plate, said distal ends of said being positioned such that said pistons move into and out of said cylinder block when said swash plate is pivoted about said pivot shaft thereby regulating the flow of said brake fluid going to said wheel brake cylinder.

9. The hydraulic brake system for a motor vehicle of claim 8 further comprising:
    a hydraulic control cylinder for manipulating said swash plate, said hydraulic, control cylinder including a displacement piston, said displacement piston having a cylindrical head portion and an elongated rod portion, a first end of said rod portion being coupled to said head portion;
    said hydraulic control cylinder including a cylindrical wall; and
    said hydraulic control cylinder being operationally coupled to a master cylinder by a section of said brake line wherein said pressurized brake fluid moves said displacement piston along said wall of said hydraulic control cylinder when said master cylinder is activated and when said master cylinder is deactivated said displacement piston moves back to its original position.

10. The hydraulic brake system for a motor vehicle of claim 9 further comprising:
    a brake pedal for applying pressure by a foot of a user, said master cylinder being operationally coupled to said brake pedal wherein when said brake pedal is depressed by a foot of a user, said master cylinder is activated thereby increasing the pressure of said brake fluid in said sections of brake line.

11. The hydraulic brake system for a motor vehicle of claim 9 further comprising:

said swash plate having a upper surface, a second end of said rod portion of said hydraulic control cylinder abutting said upper surface of said swash plate at a predetermined distance from said pivot shaft of said swash plate wherein when said displacement piston is moved said rod portion pivots said swash plate about said pivot shaft.

12. The hydraulic brake system for a motor vehicle of claim 9 further comprising:

a throttle valve for regulating the flow of brake fluid into said reservoir inlet port of said fluid reservoir from said variable displacement rotary pump and from said wheel brake cylinder; and said throttle valve having a control throttle valve port in fluid communication with said master cylinder by a section of brake line.

13. The hydraulic brake system for a motor vehicle of claim 12 further comprising:

said throttle valve having alternate positions for alternately allowing and preventing bleeding of said brake fluid from said variable displacement rotary pump and from said wheel brake cylinder into said fluid reservoir.

14. The hydraulic brake system for a motor vehicle of claim 12 further comprising:

a tubular first T-fitting adapted for coupling three sections of said brake line, said control throttle valve port of said throttle valve being operationally coupled to said first T-fitting with a section of said brake line, said master cylinder being operationally coupled to said first T-fitting with a section of said brake line, said hydraulic control cylinder being operationally coupled to said first T-fitting with a section of said brake line.

15. The hydraulic brake system for a motor vehicle of claim 12 further comprising:

a tubular second T-fitting adapted for coupling together three sections of said brake lines, said pump outlet port being operationally coupled to said second T-fitting by a section of said brake line, said throttle valve being operationally coupled to said second T-fitting by a section of said brake line, said hydraulic brake being operationally coupled to said second T-fitting by a section of said brake line.

16. The hydraulic brake system for a motor vehicle of claim 1 further comprising:

an axle housing encasing said axle, said axle housing having a axle cutout portion, said axle cutout portion being positioned adjacent said axle gear for allowing engagement of said axle gear with said pump drive gear wherein when said axle is rotating said variable displacement rotary pump is activated and when said axle is not moving said variable displacement rotary pump is deactivated.

17. The hydraulic brake system for a motor vehicle of claim 1 further comprising:

said hydraulic brake being a hydraulic brake caliper; and said distal end of said axle being connected to a rotor, said hydraulic brake caliper selectably engaged to said rotor.

18. The hydraulic brake system for a motor vehicle of claim 1 further comprising:

said hydraulic brake being a hydraulic drum braking system.

19. A hydraulic brake system for a motor vehicle comprising:

a quantity of hydraulic brake fluid;

a plurality of sections of hydraulic brake line, each section of said hydraulic line being adapted for containing said brake fluid;

a fluid reservoir for holding said hydraulic brake fluid, said fluid reservoir having a reservoir inlet port in fluid communication with a section of said brake line and a reservoir outlet port in fluid communication with a section of said brake line;

a brake pedal for applying pressure by a foot of a user;

a master cylinder for providing pressure to said brake fluid, said master cylinder being operationally coupled to said brake pedal wherein when said brake pedal is depressed by a foot of a user said master cylinder is activated thereby increasing the pressure of said brake fluid in said sections of brake line;

a variable displacement rotary pump for applying variable brake pressure, said variable displacement rotary pump including a rotating cylinder block and a valve plate rotatably coupled to said cylinder block;

said valve plate having a pump inlet port in fluid communication with a section of said brake line for allowing said brake fluid to flow into said cylinder block, said pump inlet port of said valve base further being operationally coupled to said reservoir outlet port by a section of said brake line;

said valve plate further having a pump outlet port in fluid communication with a section of said brake line for allowing said brake fluid to flow out of said cylinder block;

said variable displacement rotary pump including movable pistons for pushing in and pulling out said brake fluid being pumped into and out of said cylinder block;

said variable displacement rotary pump including a generally disk shaped swash plate for manipulating a pumping action of said pistons, said swash plate having a lower surface;

a distal end of each of said pistons abutting said lower surface of said swash plate, said pistons being positioned for moving into and out of said cylinder block when said swash plate is pivoted about said pivot shaft and said cylinder block rotates thereby regulating flow of said brake fluid going to a wheel brake cylinder;

said variable displacement rotary pump further including a hydraulic control cylinder for manipulating said swash plate, said hydraulic control cylinder including a displacement piston, said displacement piston having a cylindrical head portion and an elongated rod portion, a first end of said rod portion being coupled to said head portion;

said hydraulic control cylinder including a cylindrical wall;

said hydraulic control cylinder being operationally coupled to said master cylinder by a section of said brake line wherein said pressurized brake fluid moves said displacement piston along said wall of said hydraulic control cylinder when said master cylinder is activated and when said master cylinder is deactivated said displacement piston moves back to its original position;

said swash plate having a upper surface, a second end of said rod portion of said displacement piston assembly abutting said upper surface of said swash plate at a predetermined distance from said pivot shaft of said swash plate wherein when said displacement piston is moved said rod portion pivots said swash plate about said pivot shaft;

a pump drive rod for activating said variable displacement rotary pump, said pump drive rod having a first end extending through said valve plate and being coupled to said cylinder block for rotating said cylinder block;

a pump drive shaft having a first end coupled to a second end of said pump drive rod, a second end of said pump drive shaft terminating in a pump drive gear;

a vehicle having an axle for rotating a wheel of said vehicle, said axle having a distal end, said distal end of said axle being coupled to a rotor for slowing said vehicle down;

said axle including an axle gear adapted to engage said pump drive gear, said axle gear being positioned at a predetermined distance from, said distal end of said axle;

a axle housing encasing said axle, said axle housing having a axle cutout portion, said axle cutout portion being positioned adjacent said axle gear for allowing engagement of said axle gear with said pump drive gear wherein when said axle is rotating said variable displacement rotary pump is activated and when said axle is not moving said variable displacement rotary pump is deactivated;

a throttle valve for regulating the flow of brake fluid into said reservoir inlet port of said fluid reservoir from said variable displacement rotary pump and from said wheel brake cylinder;

said throttle valve having a control throttle valve port in fluid communication with said master cylinder by a section of brake line;

said throttle valve having alternate positions for alternately allowing and preventing bleeding of said brake fluid from said variable displacement rotary pump and from said wheel brake cylinder into said fluid reservoir;

said throttle valve including a spring valve for switching between said alternate positions of said throttle valve;

a tubular first T-fitting adapted for coupling three sections of said brake line, said control throttle valve port of said throttle valve being operationally coupled to said first T-fitting with a section of said brake line, said master cylinder being operationally coupled to said first T-fitting with a section of said brake line, said hydraulic control cylinder being operationally coupled to said first T-fitting with a section of said brake line; and a tubular second T-fitting adapted for coupling together three sections of said brake lines, said pump outlet port being operationally coupled to said second T-fitting by a section of said brake line, said throttle valve being operationally coupled to said second T-fitting by a section of said brake line, said hydraulic brake caliper being operationally coupled to said second T-fitting by a section of said brake line.

* * * * *